(No Model.)
P. GRABLER.
DRILL SOCKET.
No. 383,289. Patented May 22, 1888.
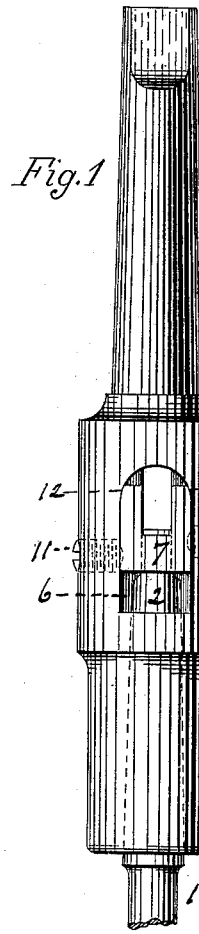
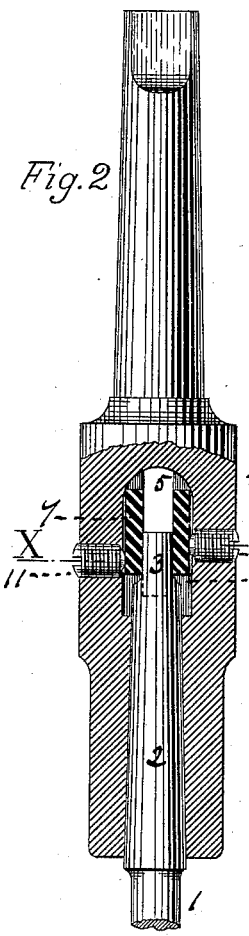
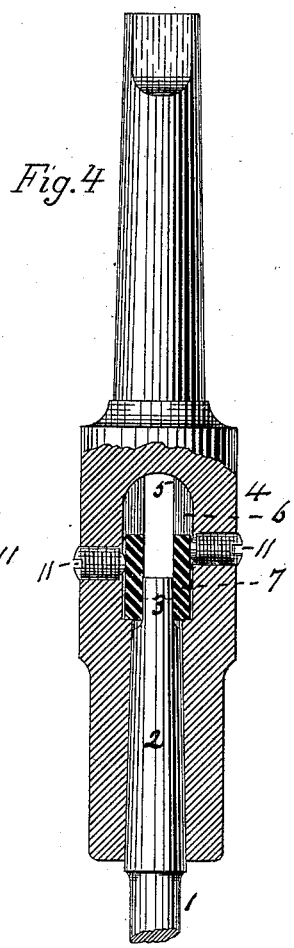
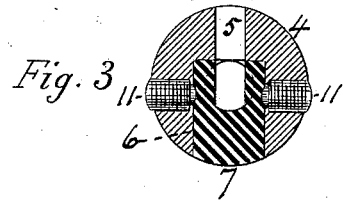
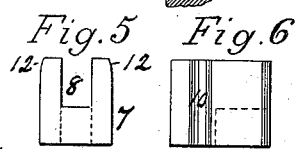
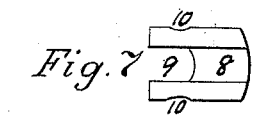
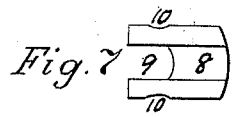
Witnesses,
Inventor,
Peter Grabler
By his Attorney

UNITED STATES PATENT OFFICE.

PETER GRABLER, OF ST. LOUIS, MISSOURI.

DRILL-SOCKET.

SPECIFICATION forming part of Letters Patent No. 383,289, dated May 22, 1888.

Application filed November 7, 1887. Serial No. 254,520. (No model.)

*To all whom it may concern:*

Be it known that I, PETER GRABLER, a citizen of the United States, residing at St. Louis, in the State of Missouri, have invented certain new and useful Improvements in Drill-Sockets; and I hereby declare the following to be a full, clear, and exact description of the same, reference being had to the accompanying drawings, in which—

Figure 1 is an elevation of a drill-socket embodying my invention. Fig. 2 is a similar view, partly in section, showing the manner in which the devices hold a drill, the devices being in their highest position, or that which they occupy when the drill is new and perfect. Fig. 3 is a transverse section on the line $x\,x$, Fig. 2. Fig. 4 is a sectional view similar to Fig. 2, showing the devices in their lowest position, or that which they occupy after the lip on the end of the drill has been broken and renewed. Fig. 5 is a detached end view of the movable spring grip-block or lip-piece, corresponding to the position of said piece as shown in Fig. 1. Fig. 6 is a side view of the movable spring grip-block or lip-piece, being one of the sides against which the set-screws press; and Fig. 7 is a top view of the movable spring grip-block or lip-piece.

Like figures refer to like parts wherever they occur.

My invention relates to the construction of drill-sockets for the reception of a drill having a tapering shank and a lip which enters a slot in the drill-socket to prevent the turning of the drill in the socket, and has for its object to provide means which will enable the drill to be used after the original lip has been twisted or broken by simply renewing the lip and without the necessity of turning down the tapering shank of the drill, as is at present done.

Drill-sockets as at present constructed have simply a tapering cavity for the reception of the tapering shank of the drill and a narrow transverse slot at the head of the cavity, which slot receives the lip on the end of the shank. Consequently, whenever the lip on the end of the drill is broken, the shank of the drill has to be turned down before a new lip which will project into the narrow slot of the drill-stock can be formed.

To center the drill, turn the taper-shank true, and form a new lip, so that the drill will again fit the drill-stock accurately, involves considerable labor and trouble, all of which is avoided by a construction of drill-stock embodying my invention.

My invention, generally stated, consists in providing the drill-socket with a movable grip-block or lip piece or block to receive the lip of the drill, which piece or block can be moved down in the drill-stock as the drill-shank grows shorter by the breaking off and renewing of the lip of the drill.

My invention also includes certain details of construction, all as will hereinafter more fully appear.

I will now proceed to describe the preferred form of my invention more specifically, so that others skilled in the art to which it appertains may apply the invention.

In the drawings, 1 indicates a drill, with its tapered shank 2 and lip 3, of the usual form.

4 indicates the drill-stock, having on one side the usual narrow slot, 5, which slot is widened and lengthened on the opposite side and across the axis of the drill-stock to form a chamber, 6, for the reception of a slotted movable grip-block or lip-piece, 7, that is adapted to be raised, lowered, and secured at any desired position in the said chamber 6 of the drill-stock.

The movable grip-block or lip-block 7 is usually of general rectangular form, as shown in Figs. 5, 6, and 7, with a horizontal open slot, 8, which forms spring-tongues on the block and gives a certain elasticity or spring to the block, and a vertical slot, 9, which forms the grip for the lip 3 of the drill. The movable grip-block 7 may have vertical side grooves, 10, for the reception of the ends of the set-screws 11.

11 indicates set-screws by which the grip-block is secured after being properly adjusted, which set-screws are preferably arranged in different transverse planes of the stock, as indicated in the drawings, as thereby the grip-block or lip-block is not only held more securely, but can be more readily adjusted.

If desired, the top of chamber 6 may be arched and the upper face of movable block 7 slightly beveled at the edges, as indicated at 12, Figs. 1 and 5.

The downward elongation of slotted chamber 6 will receive the upper portion of the tapering shank, as indicated in Figs. 1 and 2, and so much of the drill-shank as projects into such chamber 6 may be utilized from time to time in forming new lips on the drill as often as lips are broken. Until all of such projecting portions of the drill-shank have been so used, as indicated in Fig. 4, the drill can be used without turning down the taper-shank thereof.

The operations of the devices will be as follows: When the drill 1 is new, the movable grip-block or lip-block 7 will be secured in the upper part of stock-chamber 6 by means of the set-screws 11, as shown in Figs. 1 and 2, and the drill inserted in the stock so that its lip 3 engages in the vertical slot 9 of the movable grip-block or lip-block, the same as it engages in the transverse narrow slot of the ordinary drill-stock. From time to time, as the lip of the drill becomes broken or twisted and a new lip is formed, the movable grip-block or lip-block 7 is lowered in chamber 6 to compensate for the loss of length of the drill-shank and is secured in its new position, and this is continued until the grip-block or lip-block 7 occupies the position shown in Fig. 4. After this the grip-block or lip-block 7 can be returned to its first position, and the taper-shank 2 of the drill must be turned down if it is to be used further.

By means of devices of the general character hereinbefore described it is evident that the turning down of drill-shanks, which is the most troublesome part of refitting, can be almost, if not entirely, avoided and the length of time during which the drill can be used greatly prolonged.

Having thus described the nature, operation, and advantages of my invention, what I claim, and desire to secure by Letters Patent, is—

1. The combination, with a drill-stock, of a longitudinally-adjustable grip-block, substantially as and for the purposes specified.

2. The combination, with a drill-stock, of a longitudinally-adjustable grip-block having a vertical and a horizontal open slot, substantially as and for the purposes specified.

3. The combination, with a drill-stock, of a longitudinally-adjustable grip-block having the vertical side grooves for the reception of the ends of the set-screws, and set-screws for securing the adjustable drill-block, substantially as and for the purposes specified.

4. The combination, with a drill-stock having an elongated slot or chamber for the reception of an adjustable grip-block, of a longitudinally-adjustable grip-block arranged therein, and set-screws arranged in different transverse planes of the stock for securing the adjustable grip-block, substantially as and for the purposes specified.

5. The combination, with a bit-stock having a grip-block cavity, of a longitudinally-adjustable grip-block having spring-tongues arranged in the cavity of the stock, substantially as and for the purposes specified.

In testimony whereof I affix my signature, in presence of two witnesses, this 4th day of November, 1887.

PETER GRABLER.

Witnesses:
   E. S. ADREON,
   H. A. WAHLERT.